March 26, 1957  E. L. McFERREN ET AL  2,786,395
FACE PLATE ATTACHMENT FOR MACHINE TOOLS
Filed Aug. 30, 1952  3 Sheets-Sheet 1
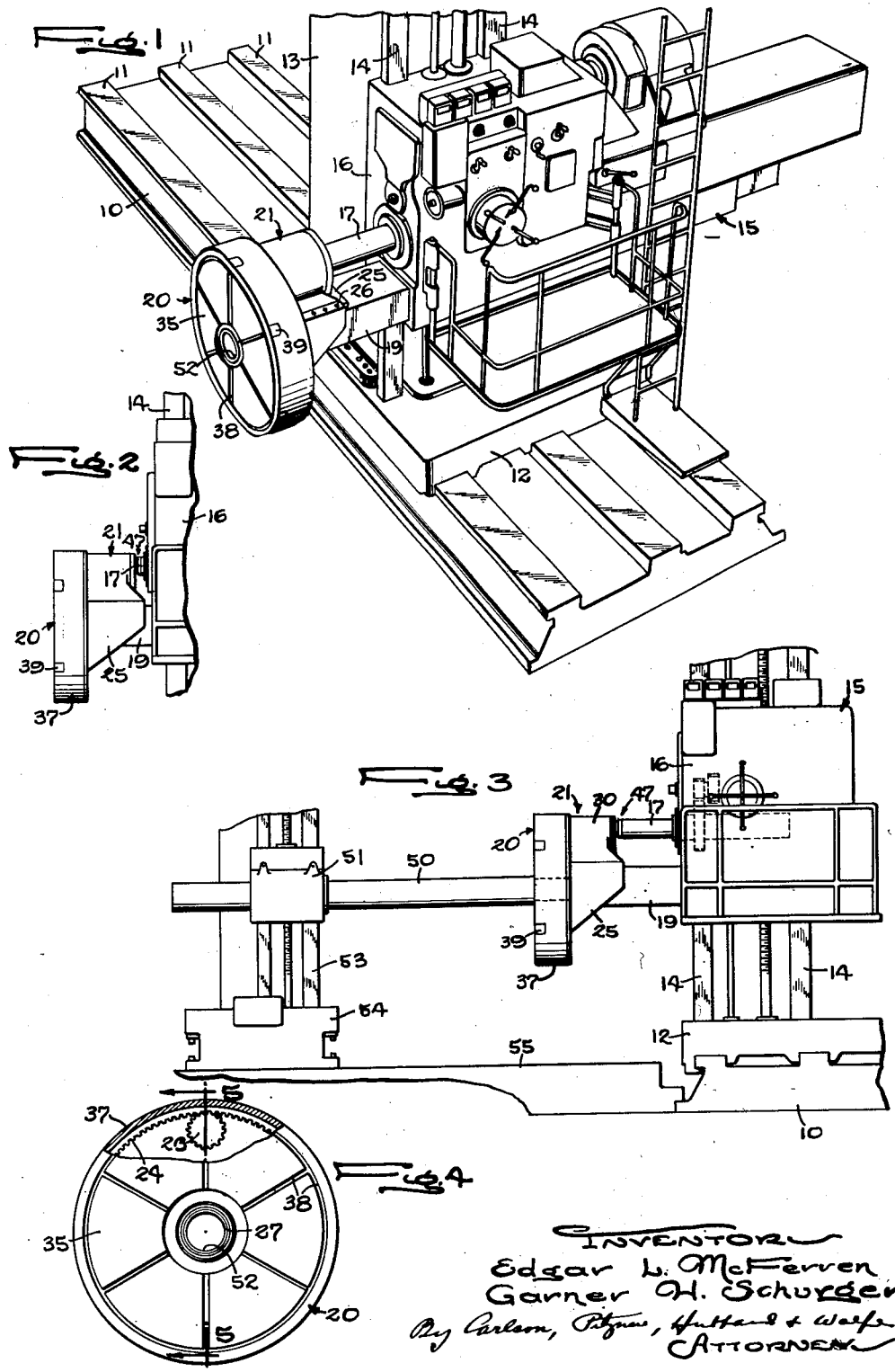
INVENTORS
Edgar L. McFerren
Garner H. Schurger
By Carlson, Pitzner, Hubbard & Wolfe
ATTORNEYS

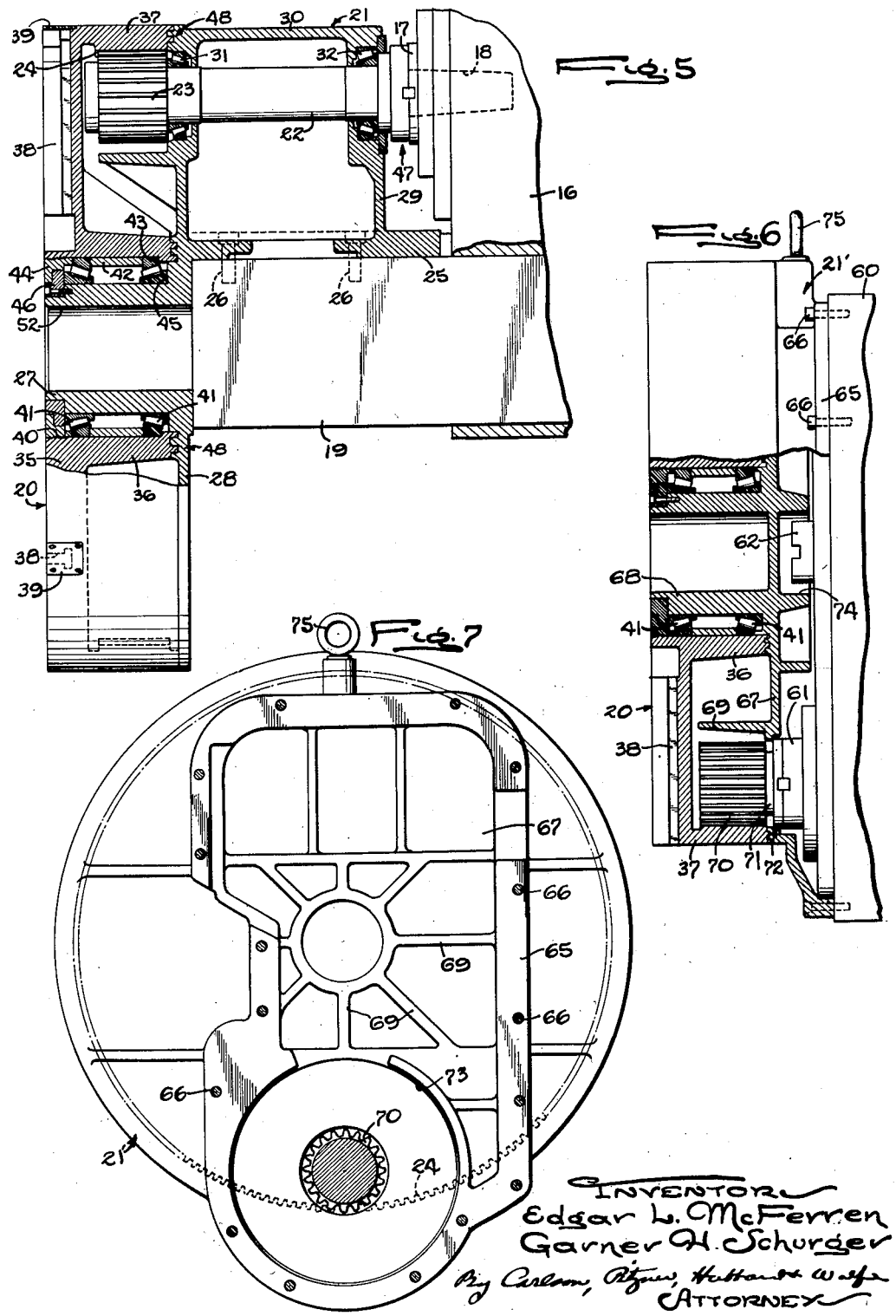

March 26, 1957 E. L. McFERREN ET AL 2,786,395
FACE PLATE ATTACHMENT FOR MACHINE TOOLS
Filed Aug. 30, 1952 3 Sheets-Sheet 3
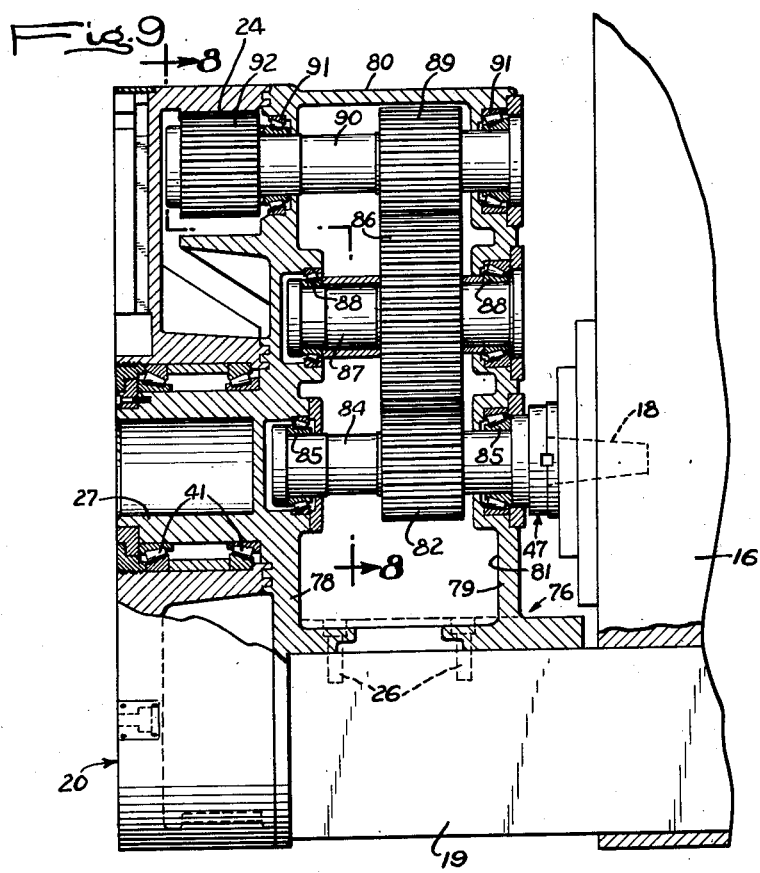
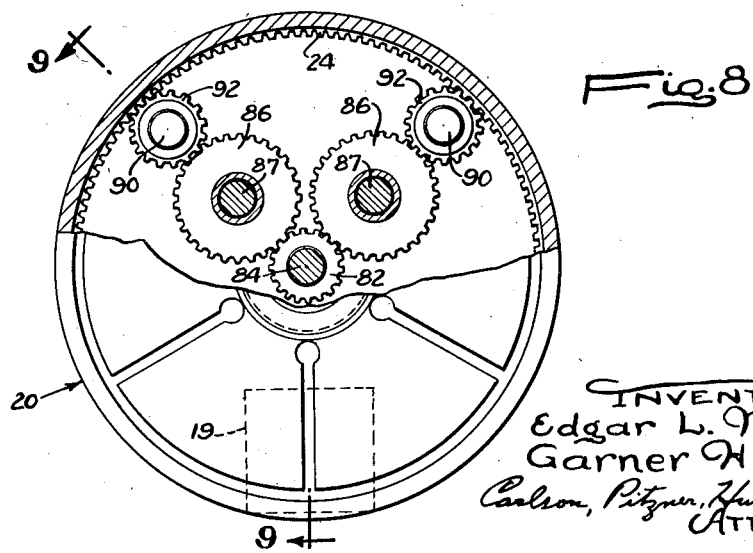
INVENTOR
Edgar L. McFerren
Garner H. Schurger
Carlson, Pitzner, Hubbard & Wolfe
ATTORNEY

United States Patent Office 2,786,395
Patented Mar. 26, 1957

2,786,395

FACE PLATE ATTACHMENT FOR MACHINE TOOLS

Edgar Lee McFerren and Garner H. Schurger, Fond du Lac, Wis., assignors to Giddings & Lewis Machine Tool Company, Fond du Lac, Wis., a corporation of Wisconsin Application August 30, 1952, Serial No. 307,198

2 Claims. (Cl. 90—11)

The invention relates to improvements in machine tools and has particular reference to a novel attachment especially adapted for use with horizontal boring, drilling and milling machines.

One object of the invention is to provide an attachment for machine tools of the above general character which affords greater flexibility for accurately machining hard to reach surfaces, unusual internal and external shoulders, off-set grooves and recesses, and thus facilitates the performance of difficult machining operations.

Another object is to provide an attachment for horizontal boring, drilling and milling machines which enables greater power to be applied to the cutting tool at the slow speed required for heavy boring on large diameters.

A more specific object is to provide a face plate attachment with a novel drive adapted to apply greater torque to the face plate and to afford a greater speed reduction than has been obtainable with prior attachments.

Still another object is to provide a machine tool attachment in the nature of a face plate embodying novel mounting and drive means which affords very sturdy and stable support for the face plate insuring true rotation thereof, and which relieves the headstock spindle of unnecessary strains, which insures against the entrance of foreign material internally thereof, and which achieves these ends while at the same time minimizing the axial dimension of the attachment.

A further object is to provide a face plate and drive attachment for horizontal boring, drilling and milling machines of the type equipped with an underarm wherein such underarm is utilized for supporting and axially translating the face plate and the headstock spindle is only required to drive the face plate in rotation.

It is also an object of the invention to provide a face plate and drive of the above general character which can be applied to and removed from the machine tool very quickly and easily thus minimizing idle machine time during change-overs.

Other objects and advantages of the invention will become apparent from the following detailed description of the preferred embodiments illustrated in the accompanying drawings in which:

Figure 1 is a perspective view of a horizontal boring, drilling and milling machine equipped with a face plate attachment illustratively embodying the features of the invention.

Fig. 2 is a fragmentary side view of the spindle end of the headstock with the attachment of Fig. 1 installed thereon.

Fig. 3 is a side elevational view of the machine shown in Fig. 1 illustrating the manner of providing outboard support to insure maximum rigidity of the attachment when projected a substantial distance from the headstock.

Fig. 4 is a front view of the face plate attachment with a portion broken away to show details of the drive.

Fig. 5 is a partial sectional view through the face plate attachment taken in a vertical plane substantially on the line 5—5 of Fig. 4.

Fig. 6 is a partially sectioned side view of a modified form of the face plate attachment adapted for application to spindle headstocks not equipped with underarms.

Fig. 7 is a rear elevational view of the attachment shown in Fig. 6.

Fig. 8 is a front elevational view of another modified form of face plate attachment, certain portions thereof being broken away to show details of the drive.

Fig. 9 is a partial longitudinal sectional view taken through the modified face plate attachment of Fig. 8 and in the plane of the line 9—9.

While we have shown and will herein describe in detail certain preferred embodiments of the invention, it is to be understood that there is no intention of limiting the invention to the particular forms shown, but on the contrary, it is intended to cover all modifications, adaptations and alternative constructions falling within the spirit and scope of the invention as expressed in the appended claims. It is also to be understood that the invention is not limited to use with the particular machine tools with which it has been shown, but that it is generally adaptable for use with machine tools equipped with horizontally disposed spindle headstocks.

For purposes of exemplification the invention has been shown in Figs. 1–5 in a form particularly adapted for use with horizontal boring, drilling and milling machines of the type equipped with an underarm. The particular machine illustrated comprises an elongated bed 10 having horizontally disposed ways 11 on its upper face supporting and guiding a translatable slide or carriage 12. An upright column 13 rising from the carriage 12 has ways 14 on its front face supporting and guiding a spindle headstock 15 for vertical movement.

Machine tools of the above general character are provided with headstocks of various forms. The headstock 15 shown is of the type disclosed in the co-pending application of K. F. Gallimore and G. H. Schurger, Serial No. 60,438, filed November 17, 1948, now Patent No. 2,730,021, issued January 10, 1956. It comprises generally, a housing 16 journaling a tool supporting spindle 17 and enclosing suitable gearing for rotatably driving and axially translating the spindle. The spindle is arranged to project at one end of the headstock housing and the projecting end is provided with suitable means such as a tapered socket 18 (Fig. 5) for attachment of a tool or fixture.

Also supported on the headstock 15 for axial translation in a path parallel to the axis of the spindle 17 is an elongated generally rectangular bar or underarm 19 available for supporting a tool or fixture to be driven by the spindle 17. Gearing is provided in the headstock for translating the underarm 19 either independently of or in unison with the translation of the spindle 17.

Referring more specifically to Figs. 1 to 5, it will be perceived that a face plate 20 is supported and guided for rotation about an axis parallel to the axis of the spindle 17 but offset or displaced laterally therefrom. Support for the face plate is provided by a supporting structure 21 which, in the form of the attachment shown in Figs. 1 to 5, is constructed and arranged for mounting on the underarm 19. The lateral spacing of the face plate axis from the spindle axis permits the plate to be driven directly from the headstock spindle 17 through the medium of a simple driving connection comprising a shaft 22 forming a part of the attachment. The shaft is adapted to be releasably coupled at one end with the spindle 17 and has a pinion 23 at its other end in driving engagement with a ring gear 24 rigid with the face plate 20. The direct drive of the spindle is highly advantageous in affording substantial speed reduction and increasing torque as compared to conventional arrangements for driving comparable machine tool attachments. Moreover, it materially simplifies the construction of the attachment and provides a more compact structure, which permits the full range of movement of the headstock to be utilized and otherwise increases the range of work for which the attachment may be employed.

Referring more particularly to Figs. 2 and 5 of the drawings, the supporting structure 21 as shown comprises a generally channel shaped bracket 25 dimensioned to fit over the projecting end of the underarm 19, and to be rigidly attached thereto as by machine screws 26. Rigid with the forward end of the bracket 25 is a stub spindle 27 for rotatably supporting the face plate 20. In the exemplary attachment the stub spindle 27 is substantially centered with respect to the underarm 19 and its axis is parallel to the axis of the headstock spindle 17.

Extending radially outwardly from the base of the stub spindle 27 is a circular wall or flange 28 adapted to close the back of the face plate 20. The flange 28 together with the back wall 29 of a housing 30 integral with or rigidly attached to the upper wall of the bracket 25 and the adjacent portion of the flange 28 carry antifriction bearings 31 and 32 for rotatably supporting the drive shaft 22. The bearings are preferably of the tapered roller type and are seated in suitable recesses formed in the flange and wall as shown in Fig. 5.

The face plate 20 is preferably in the form of a casting including a flat, circular disk 35 with integrally formed ribs on its rear face to provide strength and rigidity. Integral with the disk 35 is a central rearwardly projecting hub 36 and a rearwardly projecting flange or rim 37 extends around the peripheral edge of the disk. The flat front face of the disk 35 is formed with suitable means such as T-slots 38 for attachment of tools, fixtures or the like to the plate. In the exemplary attachment the T-slots 38 extend radially of the face plate and have the outer ends closed by removable safety covers 39 to prevent the T-bolts used therewith from falling out while the attachment is being set up. These covers also enhance the safety of the attachment in operation as they eliminate any possibility of the operator's clothing being caught in the face plate when it is turning.

As shown in Fig. 5 the face plate hub 36 has a central bore 40 for the reception of the stub spindle 27 and, in the exemplary embodiment, is supported thereon by spaced, front and rear, radial-thrust bearings, here shown in the form of tapered roller bearings 41. The outer race rings of the bearings are separated by a spacer sleeve 42 and clamped between a shoulder 43 at the inner end of the bore 40 and a retaining ring 44 threaded into the front end of the bore. The inner race rings of the bearings 41 are mounted on the stub spindle 27 and are retained in position thereon by a shoulder 45 at the base of the spindle and a retaining ring 46 removably secured to the forward end of the spindle.

The location of the stub spindle 27 and consequently the rotative axis of the face plate 20 in laterally offset relation to the axis of the headstock spindle 17 permits direct drive of the face plate from the latter spindle through the medium of the shaft 22, pinion 23 and gear 24. This not only provides a much simpler construction than has been available heretofore, but also provides for a substantial speed reduction and a corresponding increase in the torque transmitted to the face plate. The particular drive shown provides a speed reduction in the order of 7:1 although it will be appreciated that other ratios may be obtained by appropriately proportioning the parts.

It will be understood, of course, that the ring gear 24 is coaxial with the hub 36. In the preferred form of the face plate illustrated, the teeth of the ring gear 24 are formed directly in the inner wall of the rim 37. Pinion 23 is keyed or splined to the shaft 22 and the inner end of the shaft is arranged for detachable coupling with the headstock spindle, in this instance, by means of a conventional adapter and key mechanism 47. The shaft can, therefore, be drivingly connected with and disconnected from the spindle by merely sliding it axially to insert the adapter in or withdraw it from the socket 18 in the spindle.

As indicated heretofore the wall 28 of the supporting bracket serves as a closure for the rear of the face plate and is thus effective to prevent the entry of metal chips or other foreign material between the gears which drive the plate. To provide an effective lubricant seal between wall and face plate, the rear faces of hub 36 and rim 37 and the adjacent areas of the wall 28 are formed with interengaging annular ribs and grooves 48.

The ease and speed with which the improved face plate attachment can be installed on or removed from a horizontal boring, drilling and milling machine will be readily apparent from the foregoing. Preliminary to such installation, the underarm 19 is projected from its normal alined relation with the headstock spindle 17 an amount equal to the length of the seat provided on the bracket 25. Independent projection of the underarm is readily effected by manipulation of the spindle and underarm feed controls provided on the headstock. With the underarm projected, it is only necessary to slide the bracket 25 over the end of the underarm while entering the adapter 47 in the socket 18 of the headstock spindle. The attachment is then rigidly secured in place by means of the screws 26. Removal of the attachment is equally simple, it being only necessary to remove the screws 26 and slide the attachment forwardly to disengage the adapter 47 from the spindle. The machine is then ready for conventional machining operations.

In operation, the rotation of the face plate is controlled by the same instrumentalities which control spindle rotation and in precisely the same manner. In this connection it is to be noted particularly that the face plate 20 rotates in the same direction as the headstock spindle 17 so that the directional characteristics of the spindle controls remain effective with the face plate. The mounting of the face plate on the underarm provides for axial feed of the same thus adapting the attachment for operations such as boring and trunnion turning where axial feed as well as rotation of the tool is required. Control of such feed is by the underarm feed controls on the headstock operated in the conventional manner. As it is not necessary to feed the headstock in such operations, the scope of the work performed by the attachments is not limited by interference from that source or from the face plate supporting structure since that structure is confined within the limits defined by the periphery of the face plate.

When it is necessary to operate the face plate attachment while projected a substantial distance from the headstock 15, outboard support for the same may be provided by a support bar 50 (Fig. 3) and the vertically adjustable tail stock 51 conventionally provided on horizontal boring, drilling and milling machines. As shown in Fig. 3 the stub spindle 27 of the face plate attachment is formed with a central bore 52 adapted to receive one end of the support bar 50. The bar extends outwardly in the same manner as a conventional boring bar and is supported and guided for endwise movement in a tail stock 51 such as is customarily provided in machine tools of the type herein shown. The tail stock 51 of the exemplary machine is carried by a tail stock column 53 rising from slide 54 adjustably mounted on an auxiliary bed structure 55 which, in this instance, serves as a support for the work to be operated on.

The invention also provides a modified form of face plate attachment for use with boring, drilling and milling machines not equipped with underarms, which affords many of the advantages of the attachment above described such as rigid support for the face plate, substantial speed reduction, and large torque transmission. One such modified form of attachment is shown in Figs. 6 and 7 of the drawings as applied to a conventional spindle headstock 60 having a horizontally disposed main spindle 61 and an auxiliary spindle 62.

For mounting the face plate 20 on the headstock 60, a supporting structure 21' is provided. This supporting structure as shown in Figs. 6 and 7 comprises a heavily ribbed casting including a base portion 65 shaped to conform generally to the end of the housing of the headstock 60 and adapted to be secured thereto as by machine screws 66. At its forward or outer end, the base 65 merges into a transverse wall 67 of generally circular configuration and of the same diameter as the face plate 20. Centrally of the wall 67 is a forwardly projected stub spindle 68 upon which the hub 36 of the face plate is supported by the antifriction bearings 41 as described heretofore. Integral ribs 69 impart strength and rigidity to the supporting structure.

As will be seen by reference to Fig. 6 the stub spindle 68 is offset, in this instance upwardly, from the axis of the headstock spindle 61 so that a pinion 70 fastened on a short shaft 71 coupled to the headstock spindle 61 by an adapter 72 is enabled to mesh with the internal gear 24 on the rim 37 of the face plate as shown in Fig. 7. The ribs 69 are arranged to define recesses 73 and 74 at the back of the supporting structure for the accommodation of the projecting ends of the spindles 61 and 62. To facilitate handling of the attachment with a crane or hoist, an eye bolt 75 may be provided at the top of the base 65.

It will be apparent from the foregoing that the modified face plate attachment has many of the advantages of the attachment first described. Thus the mounting provided affords maximum rigidity and locates the face plate so that it may be driven directly from the headstock spindle 61 by a simple shaft and pinion drive. Large speed reduction and increased torque transmission are thus obtained. The simple construction of the attachment reduces manufacturing costs and its compact character materially increases the range of work that can be handled efficiently with the attachment.

Turning now to Figs. 8 and 9, there is shown an illustrative face plate attachment embodying another modification of the invention. This modification, in common with the embodiments described earlier herein, possesses the advantages of rigid support for the face plate, substantial speed reduction, and rotation in the same direction as the headstock spindle so as to utilize fully the instrumentalities controlling spindle rotation. Such modification possesses the additional advantage, however, of being able to transmit even higher torques than the embodiments previously described. In the following description, like reference numerals will be used to designate those parts common to this modification and to either or both of the others.

As shown in Figs. 8 and 9, the modified attachment is utilized to mount a face plate 20 on a headstock having a housing 16, tool supporting spindle 17 and underarm 19. In this instance, the face plate 20 is carried so that its rotational axis coincides with that of the headstock spindle 17, thus situating the face plate in offset relation with the underarm 19.

Rigidly secured to the underarm 19, as by means of machine screws 26, is a modified supporting structure 76 comprising a generally circular front wall 78 and a back wall 79 spaced apart from the wall 78. The walls 78 and 79 are joined by a peripheral wall 80 and, taken together, they define an enclosed chamber 81 which houses certain drive gearing. The front wall 78 is provided with a stub spindle 27 which rotatably supports the face plate 20 as by means of tapered roller bearings 41. The front wall 78 also has lubricant sealing means which coacts with similar means on the face plate in the manner already described above.

Power is transmitted from the headstock spindle 17 to the face plate 20 by one or more gear trains each of which includes a main drive pinion 82. The latter is rigidly fixed to a supporting shaft 84 journaled in antifriction bearings 85 carried by the front and back walls 78, 79. The inboard end of the shaft 84 is fixed to adapter 47, which, in turn, engages tapered socket 18 in the headstock spindle 17.

In this instance, two identical gear trains, separated by an angular interval of about 120° in the supporting structure 76, drivingly connect the main drive pinion 82 with ring gear 24 of the face plate 20. Accordingly, it will be noted that each such gear train comprises an idler gear 86 carried by a shaft 87 journaled on bearings 88 situated within the support 76, such idler meshing with the main drive pinion 82 and with an intermediate pinion 89. The latter is rigidly secured to an intermediate drive shaft 90 journaled within the support 76 by means of bearings 91. Rigidly fixed to the outer end of the intermediate shaft 90 is an outboard drive pinion 92 which meshes with ring gear 24 of the face plate in the same manner as the pinion 23 mentioned earlier herein.

By reason of the arrangement just described, it will be appreciated by those skilled in the art that the modified face plate attachment shown in Figs. 8 and 9 is capable of transmitting substantially more driving torque to the face plate than either of the embodiments previously described herein. By the same token, it will also be appreciated that the utilization of additional gear trains within the supporting structure 76 will step up the torque transmission still further. These important results are accomplished, moreover, without sacrificing any of the advantages obtained with the other embodiments.

We claim as our invention:

1. A face plate attachment for use with a machine tool having a headstock with a rotatable and axially translatable tool spindle and an underarm translatable in a path parallel to the axis of the spindle, said attachment comprising, in combination, a circular face plate having a central rearwardly projecting hub and a rearwardly projecting peripheral rim, a bracket of channel shape dimensioned to fit over and having means for attachment to the end portion of the underarm, a stub spindle extending forwardly from said bracket and engageable in said hub to support the face plate for rotation, a flange integral with said bracket extending radially from the base of said stub spindle to abut the forward end of the underarm and absorb the axial thrust imposed on the bracket in the operation of the face plate, said flange having means cooperating with the rear faces of said hub and said rim to close the back of said face plate, a housing rigid with said bracket including a wall disposed parallel to and spaced rearwardly from said flange, a shaft rotatably supported in bearings carried by said flange and said wall, and gearing drivingly connecting said shaft with said face plate, said bearings being positioned relative to said stub spindle so as to aline said shaft with the headstock spindle and said underarm when said bracket is attached to the underarm.

2. A face plate attachment for machine tools of the type having a headstock with a rotatably driven tool spindle journaled therein and an underarm translatable in a path parallel to the axis of the spindle, said attachment comprising, in combination, a circular face plate having a central rearwardly projecting hub and a rearwardly projecting peripheral flange, a bracket removably attachable to the underarm, a stub-spindle rigid with said bracket and projecting forwardly therefrom in axial alinement with said underarm for cooperation with said hub, radial-thrust type bearings interposed between said hub and said stub-spindle for rotatably supporting said plate, drive means for said plate including a ring gear rigid with said peripheral flange and disposed coaxially of said plate, a shaft journaled in said bracket adapted to be directly coupled at one end thereof to the headstock spindle and having a driving connection with said ring gear, and a flange rigid with said bracket and extending radially with respect to said stub-spindle, said radial flange being engageable with said hub and said peripheral flange so as to enclose said hub, bearings, and driving connection.

References Cited in the file of this patent

UNITED STATES PATENTS

| | | |
|---|---|---|
| 27,478 | Sellers | Mar. 13, 1860 |
| 195,085 | Brigham | Sept. 11, 1877 |
| 332,817 | Middleditch | Dec. 22, 1885 |
| 356,509 | Spencer | Jan. 25, 1887 |
| 629,874 | Santon | Aug. 1, 1899 |
| 671,565 | Schumacher | Apr. 9, 1901 |
| 861,739 | Landis | July 30, 1907 |
| 2,546,687 | Brandenburg | Mar. 27, 1951 |
| 2,620,710 | Gallimore et al. | Dec. 9, 1952 |